United States Patent [19]

Morones

[11] 4,055,433
[45] Oct. 25, 1977

[54] OIL-OUT SELF-SHINING EMULSION COATING COMPOSITION

[75] Inventor: Ricardo Morones, Racine, Wis.

[73] Assignee: S. C. Johnson & Son, Inc., Racine, Wis.

[21] Appl. No.: 637,544

[22] Filed: Dec. 4, 1975

[51] Int. Cl.$^2$ .......................... C09G 1/04; C09G 1/08
[52] U.S. Cl. ........................................ 106/10; 106/11; 106/271
[58] Field of Search ............................ 106/271, 10, 11

[56] References Cited

U.S. PATENT DOCUMENTS

| 1,986,936 | 1/1935 | Lewers | 106/271 |
|---|---|---|---|
| 2,441,842 | 5/1948 | Prince | 106/271 |
| 3,447,935 | 6/1969 | Marley | 106/10 |
| 3,666,500 | 5/1972 | Lange et al. | 106/10 |
| 3,702,769 | 11/1972 | Vaughn | 106/10 |
| 3,819,530 | 6/1974 | Ratledge et al. | 106/271 |
| 3,929,499 | 12/1975 | Thomas | 106/10 |

*Primary Examiner*—Allan Lieberman

[57] ABSTRACT

An emulsion coating composition which is self-shining and non-crevice whitening comprising from about 0.05-2% of an ethoxylated, nonionic surfactant having an ethylene oxide content of from 40-100, from about 15-70% by weight of a solvent, from about 0-30% by weight of a hard wax, from about 0-30% by weight of a soft wax wherein the combined amount of hard wax and soft wax in the composition is from about 3-35%, from about 0.3-4% of an emulsifier selected from the group consisting of oxazolines, fatty acid diethanolamides, quaternary ammonium compounds, mixtures of sorbitan monooleate and sorbitan monooleate plus 20 moles of ethylene oxide, imidazolines and mixtures thereof, and from about 20-75% by weight of water.

9 Claims, No Drawings

OIL-OUT SELF-SHINING EMULSION COATING COMPOSITION

BACKGROUND AND BRIEF DESCRIPTION OF THE INVENTION

This invention relates to an improved oil-out emulsion, self-shining coating compositions. More particularly, this invention relates to oil-out emulsion, self-shining wood floor, vinyl and vinyl asbestos floors, and terrazo floor finishes which do not crevice whiten, are substantially self-shining upon application, and which will clean water-borne stains from a floor surface.

Most finishes designed for application to wood floor surfaces, especially unsealed wood floors, are solvent systems. In those compositions, which contain water, the percentage of water varies widely depending on the intended use. Some products designed primarily for fully sealed woods, such as furniture can contain substantial amounts of water. However, it has generally been recognized that large amounts of water are detrimental to an unsealed wood surface often encountered on floors. Furthermore, most solvent wax systems and emulsion systems have a property known as crevice-whitening, i.e., wax deposits in the interstices or crevices of the wood forming a white deposit. Further, most prior solvent systems are not self-shining but must be buffed to produce a shine, or if they are self-shining are not buffable to maintain the finish.

Most prior oil-out emulsions designed for floor finishing use anionic, nonionic, or anionic-nonionic emulsification systems. Although these surfactant combinations produced stable emulsions, these products were not found satisfactory for a variety of reasons.

The compositions of the present invention obviate the problems of the prior art and provide a product which is somewhat glossy or shiny upon application, does not crevice whiten, contains high levels of water thereby allowing a less expensive product to be produced having desirable performance properties, and also the initial gloss or shine can be buffed to higher levels of shine if desired.

The floor finish emulsion compositions of the present invention comprise from 0.05–2% of an ethoxylated nonionic surfactant from 15–70% of an organic solvent; up to 30% hard wax, up to 30% soft wax, with the proviso that the total hard wax and soft wax is from 3–35%; from 0.3–4.0% of a cationic or nonionic emulsifier selected from the group consisting of oxazolidines, imidazolines, fatty acid diethanolamides, quaternary ammonium compounds, mixtures of sorbitan monooleate and sorbitan monooleate plus 20 moles of ethylene oxide and mixtures; and from 20–75% water.

It is, therefore, the primary object of the present invention to provide an oil-out emulsion coating composition having a self-shining characteristic.

It is a further object of provide a floor finish which can be applied to a number of surfaces, such as wood, terrazo, vinyl tile, vinyl asbestos tile, etc.

It is a still further object of the present invention to provide an oil-out wood floor finish which does not crevice whiten.

It is a still further object of the present invention to provide a self-shining wood floor which can be buffed to improve the shine characteristics.

Still further objects and advantages of the compositions of the present invention will become more apparent from the following, more detailed description thereof.

DETAILED DESCRIPTION OF THE INVENTION

The oil-out, self-shining emulsion coating compositions of the present invention comprise 15–70% of a hydrocarbon solvent, 0.05–2% of an ethoxylated nonionic surfactant having an ethylene oxide content of from 40–100, from 0.3–4% of an emulsifier selected from oxazoline, fatty acid, diethanolamides, quaternary ammonium compounds, mixtures of sorbitan monooleate and sorbitan monooleate plus 20 moles of ethylene oxide, imidazolines and mixtures, up to 30% of a hard wax, up to 30% of a soft wax wherein the combined amount of hard and soft waxes within the range of from 3–35%, and from 20–75% by weight of water.

The compositions of the present invention include from about 15–70% by weight and preferably from 25–35% by weight of an organic solvent. This material may be selected from a wide variety of materials and includes materials such as high flash naphtha, various isoparaffinic hydrocarbon solvents having a distillation range of from 190° F. to 540° F., preferably from 250° F. to 540° F., hydrocarbon ethers, chlorinated solvents, etc. If the distillation range is too low, the solvent evaporates too quickly, imparing spreading and leveling capacity. If the range is too high, the drying of the emulsion is retarded, producing a film which requires buffing to form a gloss or luster.

The composition of the present invention includes at least one wax. The particular wax used depends partially on the substance to be coated. A floor would require higher amounts of a hard wax while surfaces not subject to heavy use could be coated with a softer wax composition.

As used in the present specification and claims, the term "hard wax" refers to waxes having a melt point above about 80° C., while the term "soft wax" refers to waxes having a melt point below about 80° C.

The composition of the present invention includes up to 30% by weight hard wax, and up to 30% by weight soft wax, with the proviso that the total wax content is within 3–35% by weight. It is preferred that the compositions of the present invention include from about 5 to about 15% by weight soft wax.

Representative hard waxes useful in the composition of the present invention include unoxidized microcrystalline, oxidized microcrystalline, Montan acid derivatives, natural plant waxes such as candelilla, carnauba, etc., hydrogenated natural oils such as rice bran, castor oil, etc., oxidized polyethylene waxes, unoxidized polyethylene waxes, polyvinyl octadecyl ether, unoxidized Fisher-Tropsch, oxidized Fisher-Tropsch, etc.

Representative soft waxes include paraffins, oxidized and unoxidized microcrystalline having a melt point below 80° C., ozokorites, beeswax, etc.

The compositions of the present invention also include from 0.05–2% by weight and preferably from 0.01–0.2% by weight of an ethoxylated nonionic surfactant having an ethylene oxide content per mole of 40–100. These compositions preferably have a HLB value of 16–19 and most preferably 17.5–18.5. Any nonionic surfactant formed from a fatty alcohol or an aryl-alkyl group alcohol is suitable so long as the ethylene oxide content and the HLB is within the above ranges. Representative nonionics include polyoxyethylene stearate plus 40–100 moles EO, polyoxyethylene fatty glyceride plus 40–100 moles EO, polyoxyethylene sorbitol hexaoleate plus 40–100 moles EO, polyoxyethylene octadecylamine plus 40–100 moles EO, octyl phenoxypolyethoxy ethanol plus 40–100 moles EO, nonyl phenoxypolyethoxy ethanol plus 40–100 moles EO, etc.

The compositions of the present invention also include from 0.3–4% and preferably from 0.4–7% of a cationic or nonionic emulsifier selected from oxazoline, quaternary ammonium compounds, fatty acid diethanolamides, mixtures of sorbitan monooleate and sorbitan monooleate plus 20 moles of ethylene oxide, and imidazolines. These materials are available commercially under a wide variety of materials. Suitable compositions are Alkaterge-T, Varisoft 475, mixtures of Span 80 and Tween 80, Atlas G-3634A, and Schercomol I.

The composition of the present invention also includes from 20–75% by weight water and preferably from 30–70% by weight water. The water used in these compositions need not be deionized or distilled as ordinary tap water is satisfactory.

The compositions of the present invention may be prepared in either liquid or paste form, depending on the relative amounts of water and solvent used and the waxes used. For a liquid composition, from 25–55% by weight solvent and from 35–70% by weight water preferred. For paste products, from 35–75% water is used and from 15–35% solvent. The coating compositions can be prepared with a non-volatile content of from about 4–40% by weight. The non-volatile content for the liquid should be from 4–12% and preferably 6–10% by weight. For the paste, the non-volatiles should be from 12–40% and preferably from 12–20% by weight.

The compositions of the present invention may be prepared by blending the oil-soluble materials together and the water-soluble materials together. Then the oil-soluble and water-soluble materials are then blended with agitation to form a stable water-in-oil emulsion. The order of mixing is not important. Generally, it is preferred to melt the waxes prior to mixing with the water-soluble materials. The materials are mixed for approximately 10–30 minutes at 95° C. These materimaterials are then force cooled to approximately room temperture. The composition can then be optionally homogenized with any conventional homogenizer at a pressure of above 50 psig.

The compositions of the present invention also may include various optional ingredients, such as corrosion inhibitors, preservatives, various dyes, and perfumes.

The compositions of the present invention will now be illustrated by way of the following examples which are for the purpose of illustration only and are in no way to be considered as limiting.

EXAMPLE 1

A floor finish composition having the following formulation is prepared:

| | |
|---|---|
| Nonionic surfactant (Igepal CO 970) | 0.20 |
| Highflash naphtha | 37.00 |
| Paraflint RG (unoxidized Fisher-Tropsch, melt point = 102° C.) | 4.15 |
| Indramic 30 (unoxidized micro crystalline petroleum hydrocarbon melt point = 71° C) | 4.15 |
| Oxazoline (Alkaterge T) | 0.50 |
| Formaldehyde | 0.10 |
| Water | 53.90 |
| | 100.00 |

The naphtha, Paraflint, Indramic, and Alkaterge are mixed together and heated to 200° F. until the mixture is clear. The water is heated to a boil and the nonionic and formaldehyde is added. This water mixture is added to the solvent-wax mixture with agitation. The emulsion is force cooled to below 110° F. This finish is applied to a wood floor. Upon application, there is good gloss. After buffing, the gloss is very good. No evidence of crevice whitening was observed.

EXAMPLE 2

The formula and procedure of Example 1 is repeated, except the high flash naphtha is replaced with the following solvents:
1. Stoddard solvent
2. kerosene Both of the above peformed about the same as the formula of Example 1.

EXAMPLE 3

The following paste floor finish is prepared:

| | |
|---|---|
| Igepal CO 970 | 0.30 |
| Formalehyde | 0.10 |
| Bareco X 202 (modified polyolefin wax, melt point = 116° C.) | 1.00 |
| Bareco C 700 (hard microcrystalline wax, melt point = 92.5° C.) | 5.00 |
| Multiwax ML 445 (unoxidized microcrystalline wax melt point = 71–79° C.) | 6.46 |
| Alkaterge T | 0.50 |
| High flash naphtha | 20.00 |
| Water | 66.64 |
| | 100.00 |

The Alkaterge, waxes, and naphtha are heated until clear, about 220° F. The water, formaldehyde, and Igepal are heated to 200° F. with agitation. The wax-solvent mixture is added to the water with agitation until completely mixed. The emulsion is force cooled to below 110° F. This product is then homogenized using an orifice plate homogenized at 50 psig.

This finish has excellent initial and buff gloss properties and shows only slight signs of crevice whitening.

EXAMPLE 4

Example 3 is repeated, except the high flash naphtha is replaced with:
1. kerosene
2. Stoddard solvent Similar results are obtained.

EXAMPLE 5

The composition of Example 3 is prepared using the process of Example 1. Excellent results are obtained.

COMPARATIVE EXAMPLE 1

The composition of Example 5 is prepared, except the Igepal is omitted with a corresponding increase in the water content. On wood floor this composition shows a high amount of crevice whitening.

EXAMPLE 6

The following composition is prepared using the process of Example 1:

| | |
|---|---|
| High flash naphtha | 31.00 |
| Alkaterge T | 0.60 |
| Water | 59.90 |
| Multiwax ML 445 | 4.15 |
| Bareco C 700 | 2.50 |
| Duraxon J400 (oxidized Fisher-Tropsch wax, melt point = 109° C.) | 0.41 |
| Hoechst Pa 520 (unoxidized polyethylene wax, melt point = 103–107° C.) | 0.41 |
| Duraxon A-409 (hard synthetic paraffin, melt point = 116° C.) | 0.82 |
| Igepal CO 970 | 0.21 |
| | 100.00 |

This composition has superior crevice non-whitening and gloss characteristics.

EXAMPLE 7

The following compostion is prepared:

| | |
|---|---|
| High flash naphtha | 30.00 |
| Alkaterge T | 1.00 |
| Water | 58.00 |
| Multiwax ML 445 | 5.00 |
| Hoechst Pa 520 | 1.00 |
| Duraxon J400W (oxidized Fisher-Tropsch, melt point = 109° C.) | 1.00 |
| Bareco C 700 | 3.00 |
| Igepal CO 970 | 1.00 |
| | 100.00 |

The above composition has good gloss and shows minimal crevice whitening.

EXAMPLE 8

Example 3 is repeated, except the level of Igepal CO 970 is varied.
1. 0.20%
2. 0.10%

Both compositions had good gloss characteristics. However, Run 2 was worse in non-crevice whitening than either Run 1 or Example 3.

COMPARATIVE EXAMPLES 2 & 3

The following compositions were prepared:

| | #2 | #3 |
|---|---|---|
| Carnuba wax | 6.2 | 6.2 |
| Paraffin | 4.1 | 4.1 |
| Naphtha | 24.8 | 24.8 |
| Mineral oil | 2.1 | 2.1 |
| Sodium alpha olefin sulfonate | 0.9 | — |
| Petroleum base sulfonic acid | — | 0.9 |
| Water | 61.9 | 61.9 |
| | 100.0 | 100.0 |

These compositions, disclosed in U.S. Pat. No. 1,986,936, were dry crumbly pastes and showed some crevice whitening.

COMPARATIVE EXAMPLE 4

The following composition, disclosed in U.S. Pat. No. 3,088,108, was prepared:

| | |
|---|---|
| Armac C | 5.00 |
| Tergital NP-27 | 28.00 |
| Bareco C 700 | 4.00 |
| Paraffin oil | 10.00 |
| Hard paraffin wax | 9.00 |
| GE SF-96 silicone (dimethyl polysiloxane) | 0.10 |
| Water | 43.90 |
| | 100.00 |

This composition was a sticky, shiny paste not suitable for use as a wood floor finish.

COMPARATIVE EXAMPLES 5–8

A series of compositions similar to those disclosed in U.S. Pat. No. 3,553,123 are prepared:

| | #5 | #6 | #7 | #8 |
|---|---|---|---|---|
| Hoechst V[1] | 3.00 | — | — | — |
| Bareco C 700 | — | 3.00 | — | — |
| Carnuba | — | — | 3.00 | — |
| AC 6[2] | — | — | — | 3.00 |
| Oleic acid | 1.50 | 1.50 | 1.50 | 1.50 |
| Renex 30[3] | 3.00 | 3.00 | 3.00 | 3.00 |
| Durez 219[4] | 3.00 | 3.00 | 3.00 | 3.00 |
| NeoCryl B 705[5] | 5.00 | 5.00 | 5.00 | 5.00 |
| Naphtha | 48.80 | 48.80 | 48.80 | 48.80 |
| Water | 40.00 | 40.00 | 40.00 | 40.00 |
| Morpholine | 0.50 | 0.50 | 0.50 | 0.50 |
| Perfume | 0.20 | 0.20 | 0.20 | 0.20 |

[1] Hoechst V - polyvinyl octadecyl ether
[2] AC 6 - unoxidized polyethyelene wax, melt point = 104–110° C.
[3] Renex 30 polyoxyethylene ether alcohol
[4] Durez 219 - terpene phenolic resin
[5] NeoCryl B 705 - acrylic copolymer Comparative 5 is a white, water-out emulsion which inverts upon application. Comparative 6–8 are oil-out emulsions which show substantial separation on standing. None of these compositions show evidence of crevice whitening. These compositions have gloss on application but are not buffable.

What is claimed is:
1. A water-in-oil emulsion coating composition comprising:
   0.5–2% by weight of an ethoxylated nonionic surfactant having an ethylene oxide content of 40–100 moles of ethylene oxide having an HLB of from 16–19, said nonionic surfactant being formed from an alcohol selected from the group consisting of fatty alcohols and alkyl-aryl alcohols;
   up to 30% by weight of a hard wax having a melt point above about 80° C.;
   up to 30% by weight of a soft wax having a melt point below about 80° C.;
   0.3–4% by weight of an emulsifier selected from oxazolines, imidazolines, quaternary ammonium compounds, fatty acid diethanolamides, mixtures of sorbitan monooleate and sorbitan moonooleate plus 20 moles of ethylene oxide, and mixtures thereof;
   15–70% by weight of a solvent selected from the group consisting of naptha, isoparaffinic hydrocarbon solvents having a distillation range of from 190°–540° F., hydrocarbon ethers, and chlorinated solvents; and
   20–75% by weight water;
wherein the total wax content of the composition is from 3–35% by weight and the non-volatile content is from about 4–40% by weight.

2. The composition of claim 1 wherein said emulsifier is an oxazoline.

3. The composition of claim 1 wherein said nonionic surfactant has a HLB of 17.5–18.5.

4. The composition of claim 1 wherein said composition comprises:
0.01–0.2% nonionic surfactant,
5–15% hard wax,
5–15% soft wax,
0.4–0.7% emulsifier,
25–55% solvent, and
30–70% water.

5. The composition of claim 4 wherein said solvent is naphtha.

6. The composition of claim 4 wherein said emulsifier is an oxazoline.

7. The composition of claim 4 wherein said nonionic surfactant has a HLB of 17.5–18.5.

8. The composition of claim 1 wherein the non-volatile content is 6–10% by weight.

9. The composition of claim 1 wherein the non-volatile content is 12–20% by weight.

* * * * *

UNITED STATES PATENT OFFICE
CERTIFICATE OF CORRECTION

Patent No. 4,055,433            Dated Oct. 25, 1977

Inventor(s) Ricardo Morones

It is certified that error appears in the above-identified patent and that said Letters Patent are hereby corrected as shown below:

Claim 1, line 3 delete "0.5-2%"

insert -- 0.05-2% --.

Signed and Sealed this

Eighth Day of April 1980

[SEAL]

Attest:

SIDNEY A. DIAMOND

Attesting Officer

Commissioner of Patents and Trademarks